(No Model.)

C. E. P. JOHNSON.
ROPE WINDING MECHANISM.

No. 552,183. Patented Dec. 31, 1895.

Witnesses:
Frank T. Davis
John E. Donovan

Inventor:
Charles E. P. Johnson
By Geo. J. Murray
Atty

UNITED STATES PATENT OFFICE.

CHARLES E. P. JOHNSON, OF CINCINNATI, OHIO, ASSIGNOR OF ONE-HALF TO GEORGE H. JOHNSON, OF SAME PLACE.

ROPE-WINDING MECHANISM.

SPECIFICATION forming part of Letters Patent No. 552,183, dated December 31, 1895.

Application filed December 29, 1894. Serial No. 533,251. (No model.)

*To all whom it may concern:*

Be it known that I, CHARLES E. P. JOHNSON, a citizen of the United States, and a resident of Cincinnati, in the county of Hamilton and State of Ohio, have invented certain new and useful Improvements in Rope-Winding Mechanism, of which the following is a specification.

My invention is an improved rope-winding mechanism and is especially adapted for use with elevators which are operated either by steam or hand power.

The invention will be first fully described in connection with the accompanying drawings and then particularly referred to and pointed out in the claims.

Figure 1:
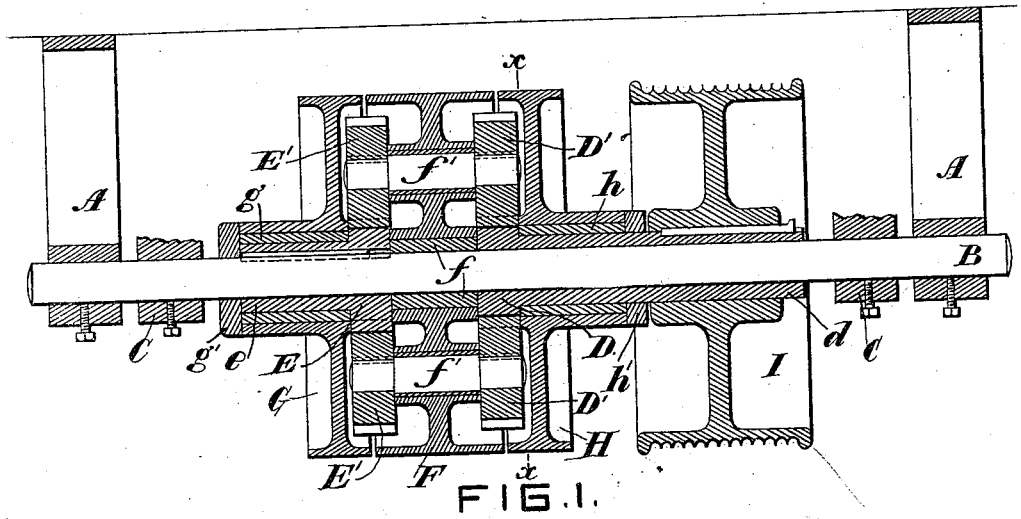
Figure 2:
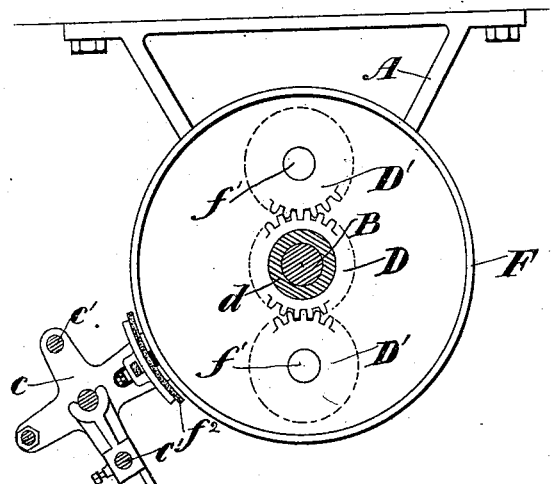
Figure 3:
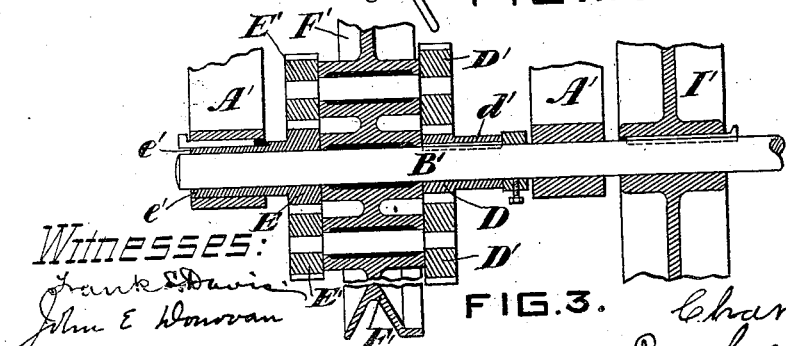

Referring to the drawings, in which like parts are indicated by similar reference-letters wherever they occur throughout the various views, Figure 1 is a vertical-diametrical section of my improved device. Fig. 2 is a transverse vertical sectional view of the same, taken through the shaft on line $x\ x$ of Fig. 1, showing in side elevation the driving-pulley and its attachments with the parts severed by the section-line on the right removed. Fig. 3 is a view, similar to Fig. 1, of the device adapted for use with a hand-hoist.

Referring first to Figs. 1 and 2, A A are hangers of any suitable construction. In this case they are shown depending from the framing-timbers above the elevator-shaft, but they may be placed in the lower floor of the building or in any suitable position. In these hangers is secured a fixed shaft B, and C are the bosses of the belt-shifting frame, which are also secured to the shaft by set-screws, so that the frame may be swung around and secured in any position upon the shaft, depending upon the position of the hangers or supports A, or the direction from which power is to be received. Upon this shaft B are fitted to revolve the pinion D and the pulley F, the hub of the pulley being provided with a bronze bushing $f$. The pinion E, which is keyed on shaft B, has an outwardly-extending hub or sleeve $e$, upon which is fitted one of the loose pulleys G, this pulley being provided with a bronze bushing $g$. The pinion D is also provided with a long sleeve $d$, upon which is fitted to revolve the loose pulley H.

This pulley is also provided with a bronze bushing $h$. Both of the pulleys are held in position by fixed collars $g'$ and $h'$, the collars $g'$ holding the pulley and pinion E in place, but the sleeve or hub $d$ extends through the collar $h$, and upon its end is keyed the rope or chase drum I. The web of the pulley F has two perforated bearings or bosses diametrically opposite each other to receive the short shafts $f'$, upon the protruding ends of which are keyed the pinions D' and E'. The shafts $f'$ are provided with bronze bushings within their bearings in the pulley F.

Each of the pinions E' and the pinion D are provided with fewer teeth than are each of the pinions D' and the pinion E. For instance, the speed or the power of the chase-drum relative to the speed of the pulley F would depend upon the variance between the number of teeth on said pinions. In the example shown in the devices that I have built for practical use, each of the pinions E' and D has twenty-two teeth, while the pinions D' and E have twenty-three, so arranged that each revolution of the pulley F advances the chase-drum a distance of two teeth. I am thus enabled to lift a very heavy load with a slight expenditure of power, but, of course, at the expense of speed in the movement of the elevator-platform, and there is no danger whatever of the platform falling should the belt break or slip, or the brake to stop the pulley F fail to operate.

The belt shifter or boss C, which is shown in Fig. 1, and the arms $c$, extending from said boss upon each side to receive the belt-shifting rods $c$, as well as the brake $f^2$, (shown in Fig. 2,) are well known constructions and need not therefore be specifically described. The only novel feature is the attachment to the shaft by means of set-screws, by which the shifter may be adjusted around the shaft to permit the belts to pass through the loops $c^2$, whatever may be the position of the countershaft. It is of course understood that a straight belt is to be employed upon one of the loose pulleys and a cross-belt upon the opposite one, so as to revolve the pulley F in either direction.

In the modification shown in Fig. 3 the arrangement of the pinions D D' and E E' is precisely the same, with the exception that they are mounted upon shafts in a grooved sheave or rope-wheel F'; but the hub e' of the pinion E extends through the fixed bearing A' and is keyed rigidly within it, while the pinion D and its hub d' are keyed upon the shaft B', as is also the rope or chase pulley I'. The shaft in this case revolves through its bearings A' instead of being fixed in them, as in Fig. 1, and the chase-drum is keyed upon the shaft which is rotated by the pinions D and D', which, in Fig. 1, rotate the sleeve upon which the chase-drum is keyed.

What I claim as new, and desire to secure by Letters Patent, is—

1. The combination of the hangers, the shaft secured in said hanger, a drive pulley mounted to revolve upon said shaft and having perforated bearings or bosses in its web, short shafts fitted to turn in said bearings, gear wheels keyed upon the protruding ends of said shafts, the wheels upon one side of the web having a greater number of teeth than those upon the opposite side, pinions mounted on the fixed shaft and meshing with the gear wheels carried by the pulley web, one of said pinions being keyed rigidly to the shaft and the other pinion having an extended hub, and the rope drum keyed upon said extended hub, substantially as shown and described.

2. The combination of the hangers or supports, the shaft secured therein, the drive pulley mounted to revolve on said shaft, having its web perforated to form shaft bearings, the shafts fitted to revolve in said bearings, gear wheels, D' and E', secured upon the protruding ends of said shafts upon opposite sides of the pulley web, the gear wheel, D, keyed upon the fixed shaft and the gear wheel, E, mounted to revolve on said shaft, both of said gears meshing with the pinions keyed upon the short shafts in the web of the drive pulley, F, and both having laterally projecting hubs, loose pulleys, G and H, mounted upon said hubs, the rope drum secured on the hub of the gear wheel, D, said gears, D' and E, having a greater number of teeth than the gears, E' and D, substantially as shown and described.

CHARLES E. P. JOHNSON.

Witnesses:
GEO. J. MURRAY,
FRANK S. DAVIS.